(12) United States Patent
Raman et al.

(10) Patent No.: US 7,680,178 B2
(45) Date of Patent: Mar. 16, 2010

(54) CROSS-CORRELATION DETECTION AND ELIMINATION IN A RECEIVER

(75) Inventors: Sundar Raman, Fremont, CA (US); Reza Abtahi, Santa Clara, CA (US); Steven A. Gronemeyer, Cedar Rapids, IA (US); Andrew Chou, Santa Clara, CA (US)

(73) Assignee: SIRF Technology, Inc., Santa Clara, CA (US)

( * ) Notice: Subject to any disclaimer, the term of this patent is extended or adjusted under 35 U.S.C. 154(b) by 684 days.

(21) Appl. No.: 11/297,802

(22) Filed: Dec. 7, 2005

(65) Prior Publication Data

US 2006/0245479 A1 Nov. 2, 2006

Related U.S. Application Data

(63) Continuation-in-part of application No. 09/909,716, filed on Jul. 20, 2001, now Pat. No. 7,106,786.

(51) Int. Cl.
*H04B 1/00* (2006.01)
*G01S 1/00* (2006.01)

(52) U.S. Cl. .................................. 375/150; 342/357.12

(58) Field of Classification Search ......... 375/144–145, 375/149–150, 326, 343; 342/357.12, 357.05
See application file for complete search history.

(56) References Cited

U.S. PATENT DOCUMENTS

| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,202,829 A | 4/1993 | Geier |

(Continued)

FOREIGN PATENT DOCUMENTS

EP 0511741 11/1992

(Continued)

OTHER PUBLICATIONS

International Preliminary Report on Patentability for International PCT Patent Application No. PCT/US2004/028926.

(Continued)

*Primary Examiner*—Khanh C Tran
(74) *Attorney, Agent, or Firm*—Pillsbury Winthrop Shaw Pittman LLP

(57) ABSTRACT

A communication device with cross-correlation detection based upon statistical tests to determine whether the off-peak signal energy is consistent with auto-correlation energy levels.

18 Claims, 6 Drawing Sheets

U.S. PATENT DOCUMENTS

| | | | |
|---|---|---|---|
| 5,225,842 | A | 7/1993 | Brown et al. |
| 5,257,195 | A | 10/1993 | Hirata |
| 5,293,170 | A | 3/1994 | Lorenz et al. |
| 5,311,195 | A | 5/1994 | Mathis et al. |
| 5,323,164 | A | 6/1994 | Endo |
| 5,343,209 | A | 8/1994 | Sennott et al. |
| 5,345,244 | A | 9/1994 | Gildea et al. |
| 5,347,284 | A | 9/1994 | Volpi et al. |
| 5,347,536 | A | 9/1994 | Meehan |
| 5,379,224 | A | 1/1995 | Brown et al. |
| 5,402,347 | A | 3/1995 | McBurney et al. |
| 5,402,441 | A | 3/1995 | Washizu et al. |
| 5,414,729 | A * | 5/1995 | Fenton ................. 375/149 |
| 5,416,712 | A | 5/1995 | Geier et al. |
| 5,420,593 | A | 5/1995 | Niles |
| 5,434,970 | A | 7/1995 | Schiffleger ............ 709/213 |
| 5,440,313 | A | 8/1995 | Osterdock et al. |
| 5,450,344 | A | 9/1995 | Woo et al. |
| 5,504,684 | A | 4/1996 | Lau et al. |
| 5,535,278 | A | 7/1996 | Cahn et al. |
| 5,592,173 | A | 1/1997 | Lau et al. |
| 5,625,668 | A | 4/1997 | Loomis et al. |
| 5,663,734 | A | 9/1997 | Krasner |
| 5,663,735 | A | 9/1997 | Eshenbach |
| 5,781,156 | A | 7/1998 | Krasner |
| 5,786,789 | A | 7/1998 | Janky |
| 5,812,087 | A | 9/1998 | Krasner |
| 5,825,327 | A | 10/1998 | Krasner |
| 5,828,694 | A | 10/1998 | Schipper |
| 5,831,574 | A | 11/1998 | Krasner |
| 5,841,396 | A | 11/1998 | Krasner |
| 5,845,203 | A | 12/1998 | LaDue |
| 5,854,605 | A | 12/1998 | Gildea |
| 5,874,914 | A | 2/1999 | Krasner |
| 5,877,724 | A | 3/1999 | Davis |
| 5,877,725 | A | 3/1999 | Kalafus |
| 5,883,594 | A | 3/1999 | Lau |
| 5,884,214 | A | 3/1999 | Krasner |
| 5,889,474 | A | 3/1999 | LaDue |
| 5,903,654 | A | 5/1999 | Milton et al. |
| 5,907,578 | A | 5/1999 | Pon et al. |
| 5,907,809 | A | 5/1999 | Molnar et al. |
| 5,917,444 | A | 6/1999 | Loomis et al. |
| 5,920,283 | A | 7/1999 | Shaheen et al. |
| 5,923,703 | A | 7/1999 | Pon et al. |
| 5,926,131 | A | 7/1999 | Sakumoto et al. |
| 5,936,572 | A | 8/1999 | Loomis et al. |
| 5,943,363 | A | 8/1999 | Hanson et al. |
| 5,945,944 | A | 8/1999 | Krasner |
| 5,963,582 | A | 10/1999 | Stansell, Jr. |
| 5,966,403 | A | 10/1999 | Pon |
| 5,977,909 | A | 11/1999 | Harrison et al. |
| 5,982,324 | A | 11/1999 | Watters et al. |
| 5,982,811 | A * | 11/1999 | Harrison et al. ........ 375/150 |
| 5,987,016 | A | 11/1999 | He |
| 5,999,124 | A | 12/1999 | Sheynblat |
| 6,002,362 | A | 12/1999 | Gudat |
| 6,002,363 | A | 12/1999 | Krasner |
| 6,009,551 | A | 12/1999 | Sheynblat |
| 6,016,119 | A | 1/2000 | Krasner |
| 6,028,887 | A | 2/2000 | Harrison ................ 375/147 |
| 6,041,222 | A | 3/2000 | Horton et al. |
| 6,047,017 | A | 4/2000 | Cahn et al. |
| 6,052,081 | A | 4/2000 | Krasner |
| 6,061,018 | A | 5/2000 | Sheynblat |
| 6,064,336 | A | 5/2000 | Krasner |
| 6,104,338 | A | 8/2000 | Krasner |
| 6,104,340 | A | 8/2000 | Krasner |
| 6,107,960 | A | 8/2000 | Krasner |
| 6,111,540 | A | 8/2000 | Krasner |
| 6,131,067 | A | 10/2000 | Girerd et al. |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,178,195 | B1 | 1/2001 | Durboraw et al. |
| 6,236,354 | B1 | 5/2001 | Krasner |
| 6,282,231 | B1 * | 8/2001 | Norman et al. ......... 375/144 |
| 6,295,024 | B1 | 9/2001 | King et al. |
| 6,313,786 | B1 | 11/2001 | Sheynblat et al. |
| 6,327,473 | B1 | 12/2001 | Soliman et al. |
| 6,332,086 | B2 | 12/2001 | Avis |
| 6,414,987 | B1 | 7/2002 | Pon |
| 6,466,161 | B2 | 10/2002 | Turetzky et al. |
| 6,466,612 | B2 | 10/2002 | Kohli et al. |
| 6,529,829 | B2 | 3/2003 | Turetzky et al. |
| 6,633,255 | B2 * | 10/2003 | Krasner ............... 342/357.12 |
| 6,650,694 | B1 | 11/2003 | Brown et al. |
| 6,680,695 | B2 | 1/2004 | Turetzky et al. |
| 6,707,423 | B2 | 3/2004 | Turetzky et al. |
| 6,788,735 | B2 * | 9/2004 | Kohli et al. ........... 375/150 |
| 6,873,288 | B2 | 3/2005 | Heppe |
| 6,901,260 | B1 | 5/2005 | Xin |
| 2002/0064209 | A1 | 5/2002 | Turetzky et al. |
| 2003/0132878 | A1 | 7/2003 | Devereux et al. ...... 342/357.06 |

FOREIGN PATENT DOCUMENTS

| | | |
|---|---|---|
| GB | 2115195 | 1/1983 |
| JP | 58-105632 | 6/1983 |
| JP | 7-36035 | 5/1986 |
| JP | 4-326079 | 11/1992 |
| WO | WO90/11652 | 10/1990 |
| WO | WO 00/45191 | 8/2000 |

OTHER PUBLICATIONS

International Preliminary Report on Patentability for International PCT Patent Application No. PCT/US2004/028542.

* cited by examiner

CROSS-CORRELATION DETECTION AND ELIMINATION IN A RECEIVER

This application is also a Continuation-In-Part of U.S. patent application Ser. No. 09/909,716, filed Jul. 20, 2001 now U.S. Pat. No. 7,106,786, entitled "Method for Reducing Auto-Correlation or Cross-Correlation in Weak Signals.

BACKGROUND OF THE INVENTION

1. Related Applications

PCT Patent Application No.PCT/US2004/028926, filed on Sep. 2, 2004, entitled SIGNAL PROCESSING SYSTEM FOR SATELLITE POSITIONING SIGNALS, by Paul Underbrink, Henry Falk, Steven Gronemeyer, Chittharanjan Dasannacharya, Charles Norman, Robert Tso, Nicolas Vantolon, Voya Protic, which is incorporated by reference herein that claims priority to U.S. Provisional Patent Application No. 60/459,961, entitled A GPS System, filed on Sep. 2, 2003 which is incorporated by reference herein, and also claims priority to U.S. Provisional Patent Application No. 60/546, 816, filed on Feb. 23, 2004, entitled "CONTROL AND FEATURES FOR SATELLITE POSITIONING SYSTEM RECEIVERS", by Mangesh Chansarkar, Sundar Raman, James Brown, Robert Harvey, Peter Michali, Bill Higgins, Paul Underbrink, Henry Falk, Charles Norman, which a claim to priority is made and is incorporated by reference herein.

PCT Patent Application titled "Control and Features For Satellite Positioning System Receivers, filed on Sep. 2, 2004 with serial number PCT/US2004/028542 that claims priority to U.S. Provisional Patent Application 60/499,961, entitled "A GPS System", filed on Sep. 2, 2003 witch a claim to priority is made and is incorporated by reference herein and also claims priority to U.S. Provisional Patent Application No. 60/546,816, filed on Feb. 23, 2004, entitled "CONTROL AND FEATURES FOR SATELLITE POSITIONING SYSTEM RECEIVERS", by Mangesh Chansarkar, Sundar Raman, James Brown, Robert Harvey, Peter Michali, Bill Higgins, Paul Underbrink, Henry Falk, Charles Norman, which a claim to priority is made and is incorporated by reference herein.

2. Field of the Invention

This invention relates generally to mobile communication systems and in particular to Satellite Positioning Systems (SATPS) aided communication systems.

RELATED ART

A Satellite Positioning System (SATPS) such as the Global Positioning System (GPS) maintained by the United States Government is based on radio navigation. The GPS system is a satellite based navigation system having a network of 24 satellites, plus on orbit spares, orbiting 11,000 nautical miles above the Earth, in six evenly distributed orbits. Each GPS satellite orbits the Earth every twelve hours.

A prime function of the GPS satellites is to serve as a clock. Each GPS satellite derives its signals from an on board 10.23 MHz Cesium atomic clock. Each GPS satellite transmits a spread spectrum signal with its own individual pseudo noise (PN) code. By transmitting several signals over the same spectrum using distinctly different PN coding sequences the GPS satellites may share the same bandwidth without interfering with each other. The code used in the GPS system is 1023 bits long and is sent at a rate of 1.023 megabits per second, yielding a time mark, sometimes called a "chip" approximately once every micro-second. The sequence repeats once every millisecond and is called the coarse acquisition code (C/A code). Every 20th cycle the code can change phase and is used to encode a 1500 bit long message, which contains "almanac" data for the other GPS satellites.

There are 32 PN codes designated by the GPS authority. Twenty-four of the PN codes belong to current GPS satellites in orbit and the 25th PN code is designated as not being assigned to any GPS satellite. The remaining PN codes are spare codes that may be used in new GPS satellites to replace old or failing units. A GPS receiver may, using the different PN sequences, search the signal spectrum looking for a match. If the GPS receiver finds a match, then it has identified the GPS satellite, which generated that signal.

Ground based GPS receivers use a variant of radio range measurement methodology, called trilateration, in order to determine the position of the ground based GPS receiver. The GPS position determination is different from the radio direction finding (RDF) technology of the past in that the radio beacons are no longer stationary; they are satellites moving through space at a speed of about 1.8 miles per second as they orbit the earth. By being space based, the GPS system can be used to establish the position of virtually any point on Earth using methods such as trilateration.

The trilateration method depends on the GPS receiving unit obtaining a time signal from the GPS satellites. By knowing the actual time and comparing it to the time that is received from the GPS satellites, the receiver can calculate the distance to the GPS satellite. If, for example, the GPS satellite is 12,000 miles from the receiver, then the receiver must be located somewhere on the location sphere defined by the radius of 12,000 miles from that GPS satellite. If the GPS receiver then ascertains the position of a second GPS satellite it can calculate the receiver's location based on a location sphere around the second GPS satellite. The two spheres intersect and form a circle with the GPS receiver being located somewhere within that location circle. By ascertaining the distance to a third GPS satellite the GPS receiver can project a location sphere around the third GPS satellite. The third GPS satellite's location sphere will then intersect the location circle produced by the intersection of the location spheres of the first two GPS satellites at just two points. By determining the location sphere of one more GPS satellite, whose location sphere will intersect one of the two possible location points, the precise position of the GPS receiver is determined to be the location point located on the Earth. The fourth GPS satellite is also used to resolve the clock error in the receiver. As a consequence, the exact time may also be determined, because there is only one time offset that can account for the positions of all the GPS satellites. The trilateration method may yield positional accuracy on the order of 30 meters; however the accuracy of GPS position determination may be degraded due to signal strength and multipath reflections.

As many as 11 GPS satellites may be received by a GPS receiver at one time. In certain environments such as a canyon, some GPS satellites may be blocked out, and the GPS position determining system may depend for position information on GPS satellites that have weaker signal strengths, such as GPS satellites near the horizon. In other cases overhead foliage may reduce the signal strength that is received by the GPS receiver unit. In either case the signal strength may be reduced or totally blocked. In such case, aiding information may be used to aid in location determination.

There are multiple ways of using radio spectrum to communicate. For example in frequency division multiple access (FDMA) systems, the frequency band is divided into a series of frequency slots and different transmitters are allotted different frequency slots. In time division multiple access (TDMA) systems, the time that each transmitter may broadcast is limited to a time slot, such that transmitters transmit their messages one after another, only transmitting during their allotted period. With TDMA, the frequency upon which each transmitter transmits may be a constant frequency or may be continuously changing (frequency hopping).

A Satellite Positioning receiver is capable of receiving multiple positioning signals from the satellites. Typically, some type of correlation is used within the receiver to identify the different PN codes that identify a signal as originating from an associated receiver. One type of correlation is Auto-correlation that is the correlation of the received signal with a replica signal that is associated with a desired PN code.

Another type of correlation that exists is a cross-correlation which is the correlation of the desired PN code with an undesired PN code. PN codes in satellite positioning systems have only limited cross correlation resistance properties. Typically if the signal strength of a strong signal minus the signal strength of a weaker signal is less than 20 dB cross-correlation is not an issue. For higher sensitivity where the difference becomes greater than 20 dB, typical cross-correlation is an issue and needs to be addressed.

Therefore, there is a need for methods and systems for improving the ability of communication devices to quickly and efficiently locate a communication system to be used employed for communication.

SUMMARY

Approaches consistent with the present invention provide cross-correlation detection based upon statistical tests to determine whether the off-peak signal energy is consistent with off-peak auto-correlation energy levels. The largest values in the off-peak magnitudes are examined and a conclusion of either auto-correlation, cross-correlation, or inconclusive results. A further comparison is made to compare the average off-peak magnitude and the expected off-peak magnitude that results in a conclusion of either auto-correlation or cross-correlation. By evaluating the resulting conclusion a determination of cross-correlation may be made.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Unlike the known approaches of cross-correlation previously discussed, cross-correlation detection may be based upon statistical tests to determine whether the off-peak signal energy is consistent with the off-peak auto-correlation energy levels. In other words, this test may be thought of as a white noise test that determines the off-peak correlations are as expected for a correlation. If the off-peak correlations contain statistical anomalies, then the peak detection may not be a desired auto-correlation because the peak was artificially inflated by same unexpected correlation energy from an undesired PN code.

Figure 1:
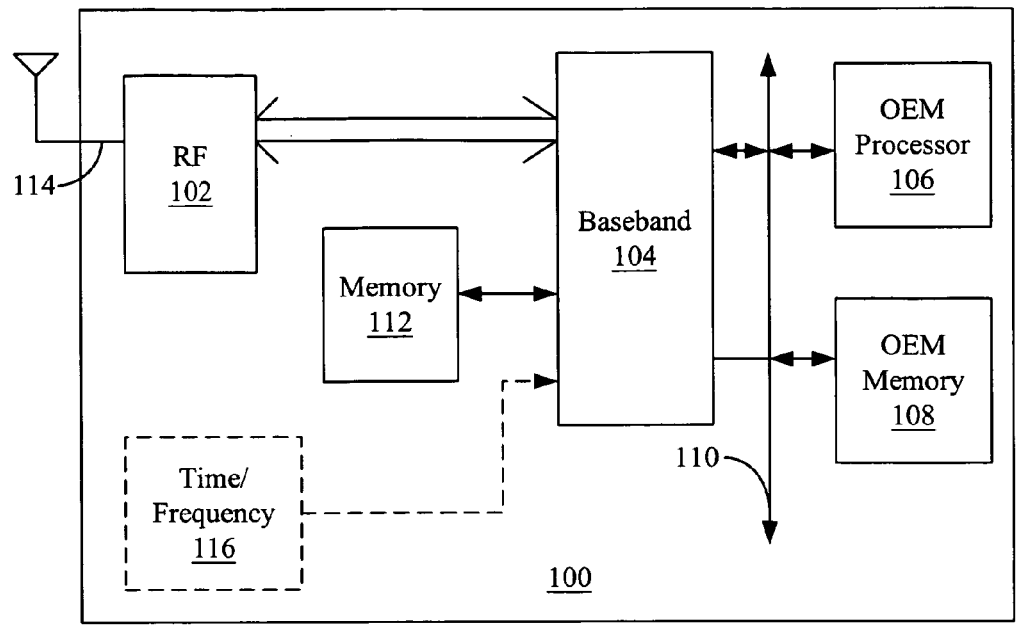
FIG. 1 illustrates a block diagram of an embodiment of a GPS receiver.

Turning to FIG. 1, a block diagram of an embodiment of a GPS receiver 100, including a radio frequency ("RF") component 102 and a baseband component 104. In one embodiment, the RF component 102 and the baseband component 104 may interface with additional functionality provided by an original equipment manufacturer ("OEM") subsystem, or "host" processor 106 and OEM memory 108 over a bus 110. As will be described below, the baseband component 104 may communicate with a memory component 112. The memory component 112 may be separate from the baseband component 104. In other implementations the memory component 112 may be implemented within the baseband component 104. The RF component 102 may be directly coupled to an antenna 114 that is dedicated to the RF component 102. In other implementations, the antenna 114 may be shared by the RF component 102 and an OEM receiver (not shown). Optionally, the OEM memory 108 may be separate from the memory component 112 and independent from the baseband component 104. Other possible arrangements may include one or more RF components and one or more baseband components being on one or more chips with all of the required memory and processing power to perform the GPS functions. In yet other implementations, multiple chips may be used to implement the GPS receiver 100 and may be combined with technology such as flip-chip packaging.

The GPS receiver 100 may also have a time/frequency component 116. The time/frequency component 116 may provide timing for tracking loops and real time clocks that function during power control conditions. The time/frequency component may be implemented as a real time clock and/or numerical controlled oscillators. The time/frequency component 116 may be in direct or indirect communication with the baseband component 104.

The GPS receiver 100 may operate without aiding information, or alternatively, it may operate with aiding information from a variety of sources and have additional hardware circuitry and software to communicate with a communication network or communicate with another network via the OEM processor 106. The communication may be implemented using standards, such as adopted by the Institute of Electrical Engineers, International Standards Organization, or Cellular communication standards, or by using a proprietary communication approach. Furthermore, the baseband component 104 may include such circuitry as a digital signal processor ("DSP"), an ARM processor, clock components, various memory components, various interface components for external and internal communication, etc.

Figure 2:
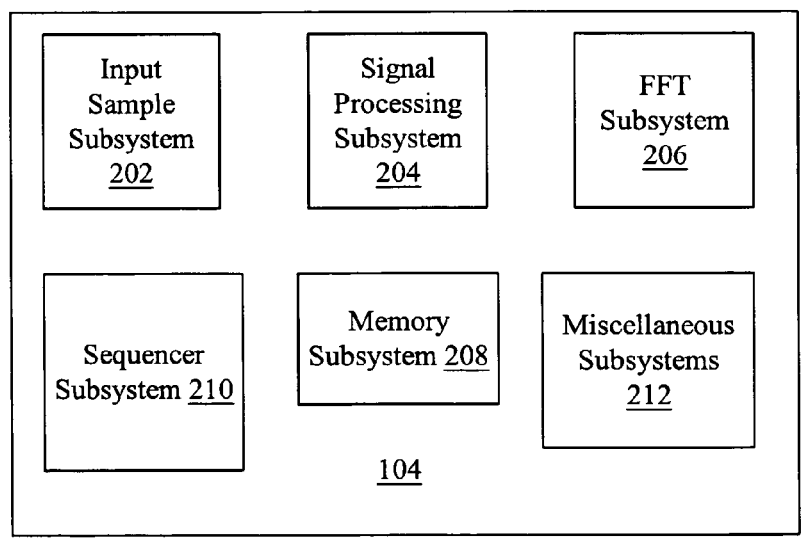
FIG. 2 is a block diagram showing subsystems of a baseband chip from the GPS receiver of FIG. 1.

In FIG. 2, a block diagram shows subsystems of an embodiment of the baseband component 104, including an input sample subsystem 202, a signal processor subsystem 204, a FFT subsystem 206, a memory subsystem 208, a sequencer subsystem 210, and another "miscellaneous" subsystem 212. For convenience herein the subsystems may be referred to as groups of processes or task implemented along with associated hardware. The division of tasks or functionality between the subsystems typically is determined by design choice.

In different implementations, the different subsystems may share functionalities in different ways, or there may be more a less subsystems. For example, in some implementations the sequencer subsystem 210 may not be a separate subsystem. Rather a part of the sequencer functionality may reside in one subsystem while the remaining functionality resides in another subsystem.

The input sample subsystem 202 receives signal data from the RF component 102, FIG. 1, and stores the signal data in RAM that is part of the memory subsystem 208, FIG. 2. raw digitized signal data or minimally processed decimated signal data may be stored in RAM. The ability to store the digitized RF signals may occur in one of two ways. The first is that data may be gathered by the input sample subsystem 202 in increments of 20 milliseconds and stored in RAM with the process being repeated over and over. The other approach is for the input sample subsystem 202 to use a cyclic buffer in RAM. For example the input sample subsystem 202 would fill a region of the RAM and then overwrite the data upon cycling through the buffers. Such an operational approach would have the software set up the signal processing subsystem 204 and the FFT subsystem 206 in such a way to process the signal data fast enough before the signal data is overwritten in the cyclic buffer. The operational approach may be selectable with the software configuring the approach that best meets the needs of the user and RF environment upon the GPS system 100 being initialized. In other embodiments, the operational approach used by the input sample subsystem 202 may be changed during operation of the GPS receiver 100.

The memory subsystem 208 manages the memory resources of the GPS receiver 100. A single memory area may be subdivided into different types of memory areas. Examples of the subdivided memory areas may include input sample memory, coherent buffers, cross-correlate memory, non-coherent buffers, channels state, track history, and report memory. The input sample memory may also be subdivided further into channels with the signal processing subsystem 204 and FFT subsystem 206 accessing different channels with context switching between the channels.

The miscellaneous subsystems 212 may include hardware and software for implementing a convolutional decoder for WAAS aiding data. The miscellaneous subsystems 212 uses data from the memory subsystem 208 and may provide information to other subsystems by writing into the channel state RAM area or other control/status areas in the memory subsystem 208.

Figure 3:
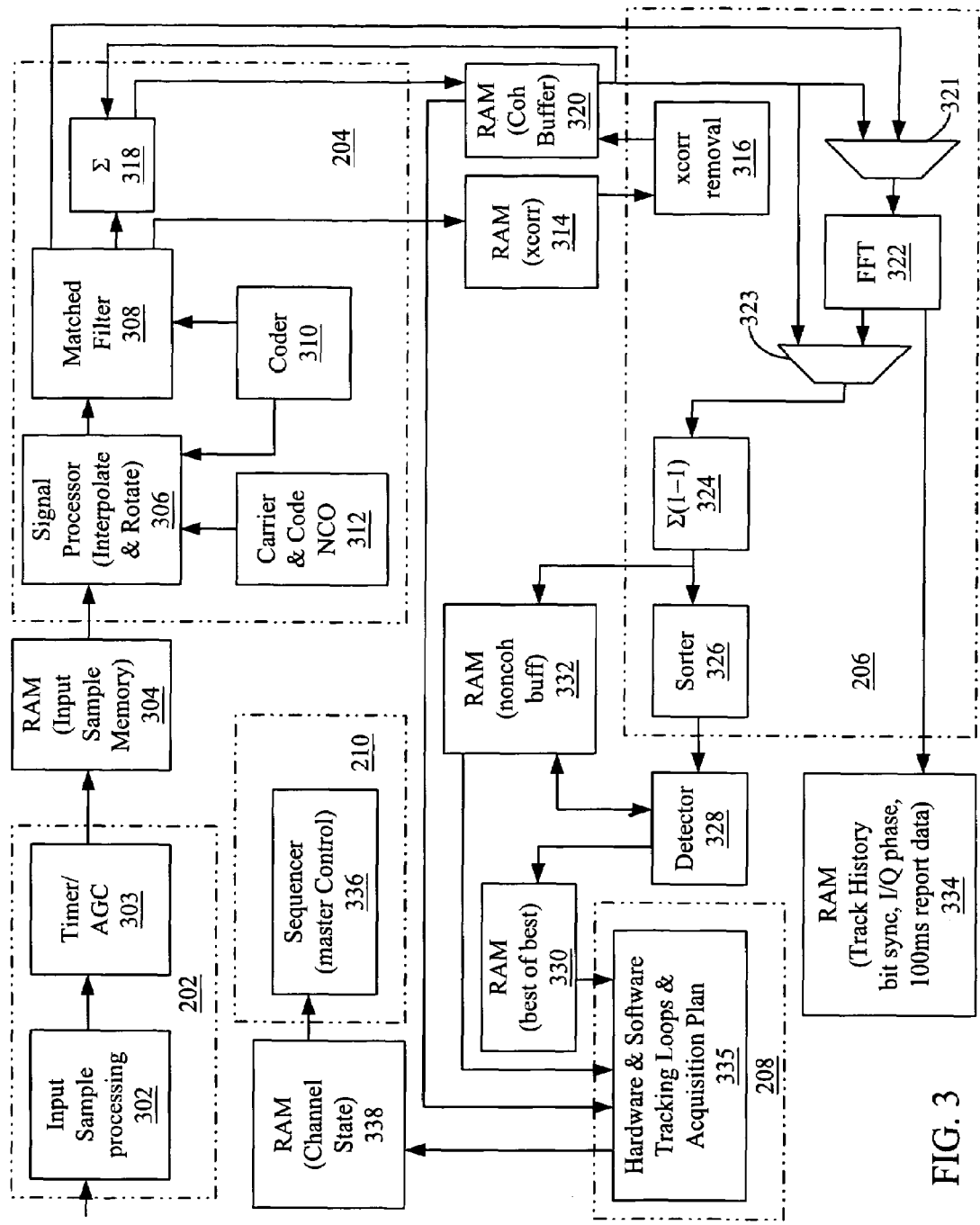
FIG. 3 is a block diagram illustrating general data flow between subsystems of the GPS receiver of FIG. 1

Turning to FIG. 3, a diagram of signal flow between the subsystems of the GPS receiver 100 of FIG. 1 is shown. A RF signal, such as a CDMA GPS satellite signal, is received by the RF component 102, FIG. 1, and passed to the input sample processing subsystem 202, FIG. 3. The input sample processing subsystem 202 may include an input sample processing block 302 and a Timer/Automatic Gain Control (AGC) block 303. The Timer/AGC block 303 is made up of a number of counters, timers, and alarm generators that are used to sample input pulses of the input signal. The Timer/AGC block 303 may also create interrupts, start software and hardware functions at known times as well as conducting synchronization, and frequency and phase measurement. The Timer/AGC block 303 may provide the ability to synchronize two systems or subsystems by generating precision time alignment pulses or by accepting input pulses from other systems in addition to making relative frequency and phase measurements. For example in systems having a low power real-time (RTC) clock with a low cost watch type crystal, the watch type crystal may be calibrated to GPS time by the Timer/AGC block 303 in order to use the low cost low power RTC during power control conditions.

The input signal may be divided into digital samples in the input sample processing subsystem 202 with the output being stored in random access (RAM) memory 304. The RAM may be any type of read/write memory that may be written to and read from at a rate to keep data flowing between the input sample subsystem 202 and the signal processing subsystem 204. The signal processing subsystem 204 may have a signal processor 306 that interpolates and rotates the received signals from RAM 304.

The signal processor 306 may be used to remove the carrier Doppler and code Doppler from the received signals before the received signals are further processed and filtered. The signal processor 306 may be reconfigurable to operate in a variety of different sampling and decimation modes. In the highest performance mode, for example, the signal processor 306 may use sixteen samples per chip input and produces eight phase eight samples per chip output. In another mode the signal processor 306 may have four samples per chip input that may be interpolated to sixteen samples per chip by repeat sampling and filtering to produce better code phase output while reducing loss that typically occurs at low sampling rates. The modes of the signal processor 306 may be software controlled via parameters that are passed into the signal processor through the channel RAM.

Thus, the signal processor 306 extracts the input samples from the RAM 304 and prepares them for use by the matched filter 308. Depending on the mode of the matched filter 308 the input samples will be interpolated and/or decimated to the correct sampling rate for the matched filter 308. For example if the input samples are stored at 8f0 and the matched filter mode warrants using samples at $2f_0$, the signal processor 306 will decimate the input sample stream to $2f_0$. This provides additional flexibility in using various matched filter modes for various channel/satellite vehicle processing. The signal processor 306 may also rotate the complex input samples to remove the residual carrier Doppler from the signals and may be accomplished using the carrier NCO and code NCO outputs in conjunction with the input sample stream.

The signal processor subsystem 204 may also include a matched filter 308, coder 310, carrier and code numeric coded oscillator (NCO) 312, cross-correlator block 314, cross-correlation removal block 316, and a coherent summation block 318. The signal is processed and specific satellite signals identified. The carrier and code NCO 312 generate the pure carrier and code signals for use by the signal processor 306. The carrier and code NCO 312 may be programmable oscillators that may use counters to implement. The use of independent carrier and code NCOs for various channel/satellite vehicle processing provides flexibility for supporting the different types of processing modes in the GPS receiver.

The carrier and code NCO 312 enables a carrier to code transfer that does not require multiplication steps. Typically carrier to code aiding is done with limited resolution multipliers. The carrier and code phase transfers may be accomplished with an accumulated remainder without any error between carrier and code phase. It enables very narrow code loop bandwidths without the slippage or drift between the carrier and code phase as found in implementations that use limited resolution multipliers. The code phase is locked to the carrier and small adjustments may be made to the code phase relative to the carrier. By keeping track of the adjustments, a full resolution carrier and code phase may be reconstructed from few bits and flip-flops than other known methods.

The matched filter 308 may be configurable for various precision levels and code phase fractions. The GPS code is 1023 chips long and the match filter 308 may process or despread a full millisecond of the GPS code when operating in a full mode. In another mode, four subdivisions may be feed into the FFT to improve the frequency range or bandwidth searched per correlation. Yet, other modes may double the number of chips by dividing the chips. Thus, a tradeoff may be made between a fractional division in order to double the precision of the data that is correlated. The mode of the match filter 308 may be controlled and configured by the software depending on the operation mode and the power control setting of the GPS receiver 100.

For example if the GPS receiver 100 has information that only a fraction of the code chips need to be searched or tracked, the matched filter 308 may be set in half mode or a smaller mode. Such configuration will enable the use of smaller amounts of memory and result in a lower throughput data rate for the matched filter 308 and its outputs. On the other hand if the entire code phase needs to be searched, the matched filter 308 may be configured in a full mode making full use of processing power. The use of programmable T1 epochs allow for various coherent integration times for various channel/satellite vehicles thereby providing different frequency resolution in the searches.

The signals after being processed by the signal processor subsystem 204 are passed via RAM (coherent buffer 320 and cross-correlator 314) to the FFT subsystem 206. The cross-correlator 314 may be used to identify despread signals from a weak satellite. The software may save the output of signal processing subsystem 204 and makes it available to the FFT subsystem 206 for further cross correlation processing.

The cross-correlator 314 holds the output of the matched filter 308 in complex form (I,Q) for use by a cross-correlator removal process. In the cross-correlator removal process, knowledge about the strong signal is required, and hence, strong signal processing is typically completed before the weak signals processing commences. This cross-correlator 314 provides the flexibility in allowing for more lag in the strong signal processing than other known approaches.

The coherent buffer 320 may be a first in first out (fifo) buffer that passes blocks of data from the output of a coherent accumulator to the input of the FFT 322. Each block of data in the coherent buffer 320 represents the shortest integrating time in the system and is associated with a scale factor to keep it within eight-bits (may be an exponent representation) of the value stored in FIFO1. Normalization may occur between the data stored in the coherent buffer 320 in order to have common scaling between the data supplied to the FFT 322. When operating in a locked mode, the data from the matched filter 308 may be directly feed to the FFT 206.

The coherent buffer 320 holds the output of the matched filter 308 as a complex value (I, Q). The coherent buffer 308 may be shared between channels or may be dedicated under software control. This provides flexibility for optimum use of the memory resources. For example if the receiver has information that allows processing of only the NCS buffers or peak buffers, then the coherent buffer 320 may be shared between channels resulting in memory resource savings.

The FFT subsystem 206 may include a multiplexer 321 that multiplexes the output of the matched filter 308 and data from the coherent buffer 320 and may be coupled to the Fast Fourier Transfer (FFT) block 322. The FFT subsystem 206 may also include a second multiplexer 323, a filter block 324, and a sorter block 326. The output of the FFT subsystem 206 may be from the sorter 326 to a detector block 328, from the non-coherent summation of the signal magnitude 324 to the non-coherent RAM 332, and from the FFT 322 to the Track history in RAM 334.

The track history in RAM 334 is a channel dependent buffer that may be generated for each channel. It contains information about the hardware tracking loop and its inputs are a time history. This channel dependent buffer may be used by software to execute software tracking loop algorithms to compute CNO, loss of lock and measurements. This information may also be used to run software tracking loops if the system warrants. Thus, the Track history in RAM 334 provides flexibility and enables a tradeoff between hardware and software processing for different channels. The Track history buffer may be enabled or disabled for various channels independently.

The FFT subsystem 206 is configured to enable short coherent integrations and combine them and get the effect of doing many times the correlations at different offset frequencies and avoids having to rerun the signal processing subsystem, thus resulting in a power savings. The FFT 322 may also generate other types of data for use by the GPS receiver 100, such as, for example, bit-sync and generation of a frequency discriminator for use by the tracking loops.

The detector 328 interfaces with the non-coherent RAM 332 and writes the data extracted to RAM 330. The non-coherent RAM 332 is a buffer that contains a three dimension histogram of code offset, millisecond offset and frequency offset that may be resolved by choosing the largest peak in the non-coherent RAM 332. Bias removal and scaling also may occur within the data in the non-coherent RAM 332. A list of the largest eight peaks may be stored in memory 332 to aid in selection of the largest peak. In other implementations, different amounts of the peaks may be stored. The list may be implemented as a linked list or other searchable data structure. In other embodiments, different numbers of peaks besides eight may be stored in memory.

Figure 4:
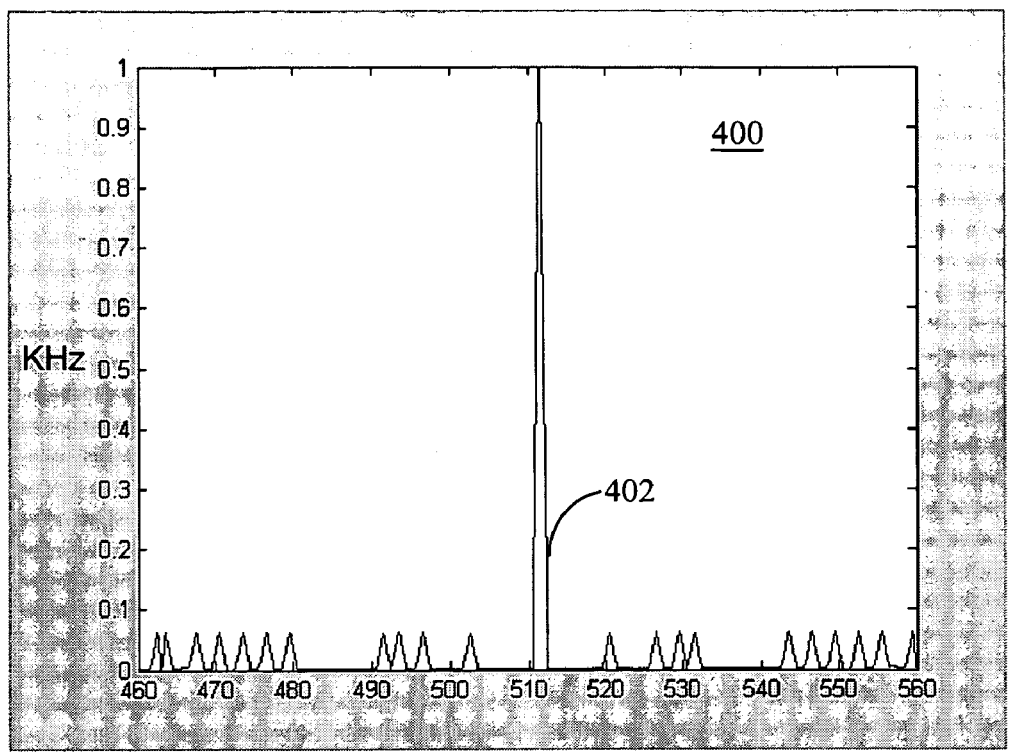
FIG. 4 illustrates a plot of an auto-correlation peak over a period of 100 Chips.
Figure 5:
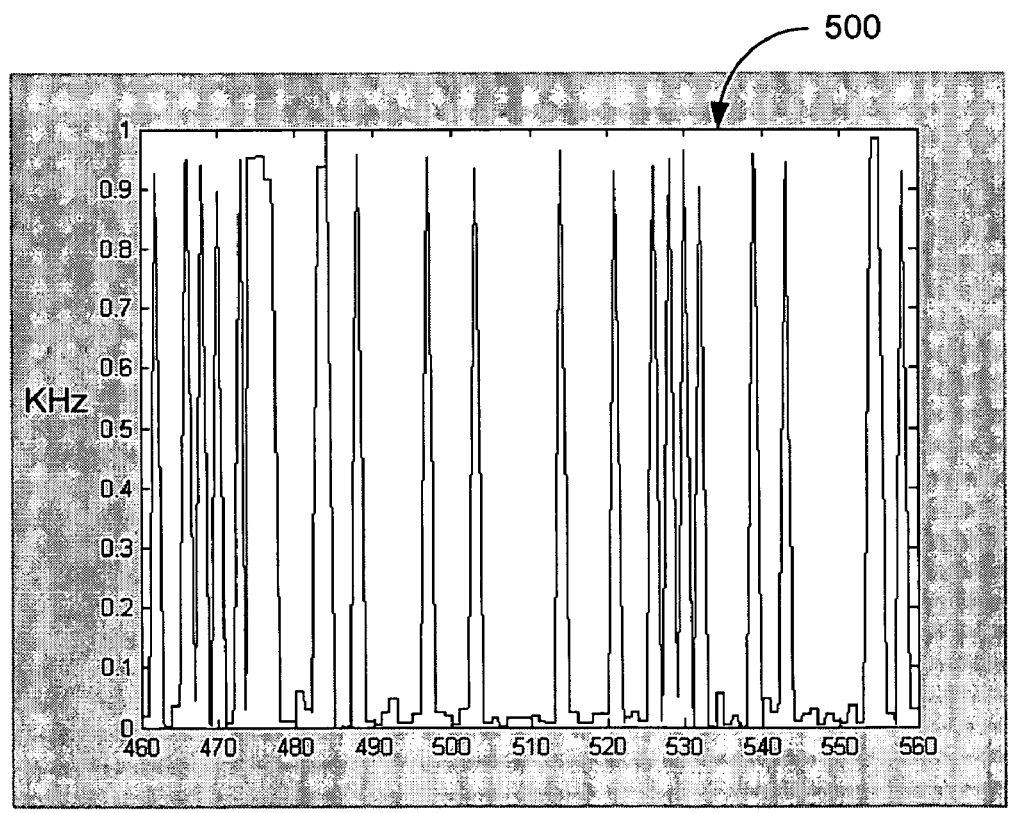
FIG. 5 illustrates a plot of cross-correlation with zero Doppler.

In FIG. 4, a plot of an auto-correlation peak over a period of 100 Chips is illustrated 400. The peak is shown in magnitude over the period of 100 Chips. The received signal being correlated with a replica signal is properly aligned when the PN code, frequency and code phase are aligned resulting in peak 402. Turning to FIG. 5, an illustration of a cross-correlation plot 500 with zero Doppler is shown. Thus, the difference between cross-correlation and off-peak auto-correlation is shown. Typically, the statistics of the cross-correlation off-peak magnitudes are substantially different from the off-peak magnitudes in auto-correlation. Hence, for large peak values, it is possible to distinguish cross-correlation from auto-correlation. But, if the peak value is at the level of detection, it is more difficult to distinguish cross-correlation from auto-correlation.

Cross-correlation detection may be based upon the following hypothesis test. The hypothesis test involves; a) the auto-correlation of a real signal, b) cross-correlation of an undesired stronger signal. The off-peak signal correlations may be generated by Auto-correlation of real a real signal and Cross-correlation from a stronger signal. In most hypothesis testing, there are typically two key parameters: 1) Probability of a false positive (saying a cross-correlation is an auto-correlation), and 2) Probability of false negative (saying an auto-correlation is a cross-correlation).

At least two tests may be conducted to distinguish cross-correlation from auto-correlation. The first test is a Max comparison test that determines the largest values in the off-peak magnitudes and based upon these results, a conclusion of either auto-correlation, cross-correlation or inconclusive results. The second test is an Average comparison test that computes the average off-peak magnitude and compares them against expected off-peak magnitude and make a determination of either auto-correlation or cross-correlation. The two different test approach is desirable because of the ease of implementation of the Max comparison, while that average comparison gives better results, while requiring more processor resources. In other implementations, each test may be executed independently of the other producing and made to provide a binary decision of either auto-correlation or cross-correlation.

The Max comparison test is implemented by:
 1. Determining the maximum off-peak energy value, M1. If M1 is less than a threshold T1, then conclude auto-correlation.
 2. Determine the fourth largest off-peak value M4. If M4 is greater than a threshold T2, then conclude cross-correlation.

The Average comparison test is implemented by:
 1. Averaging together all off-peak energy values "A."
 2. If A is less than a threshold T3, then conclude auto-correlation, otherwise, conclude cross-correlation.

The thresholds T1, T2 and T3 are based upon the following parameters:
 PDI size
 Noise Level
 Number of noncoherent sums, B
 Number of code phases, N
 Size of detected peak, P
 Probability of false positive, pfp T1 may be set to half the sample size, i.e. 50 if a 100 chips sample is used. T1 may be equal or less than T2. In other implementations, the test may be done in a different order.

For Example, if two different PN's (from 1 to 32) and a uniformly random Doppler offset from −10 to +10 kHz are chosen in a random code phase range of 100 chips, then a correlation (in magnitude) and peak value may be determined. The surface may be scaled or normalized, such that the peak value is 1 and the peaks within two chips on each side of the peak may be excluded. Two statistics of the off-peak correlations are then computed. The first is the Maximum off-peak value and the second is the average of the off-peak values where an off-peak value is a peak after the exclusion of the main peak and the peaks within two chips on each side of the peak. In other implementations, other amounts of chips beside two chips on each side of the main peak may be excluded.

Figure 6:
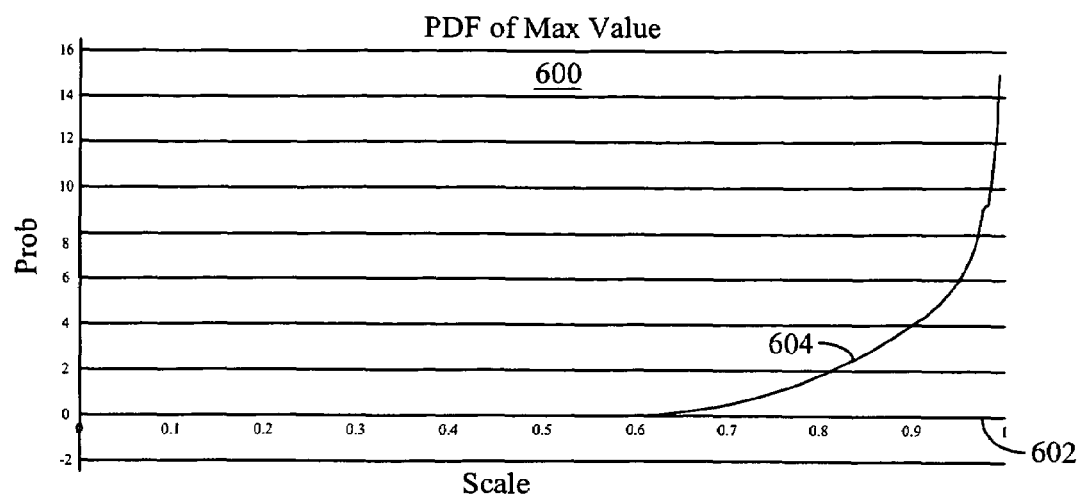
FIG. 6 illustrates the plot of the Probability Density Function (PDF) of maximum values.
Figure 7:
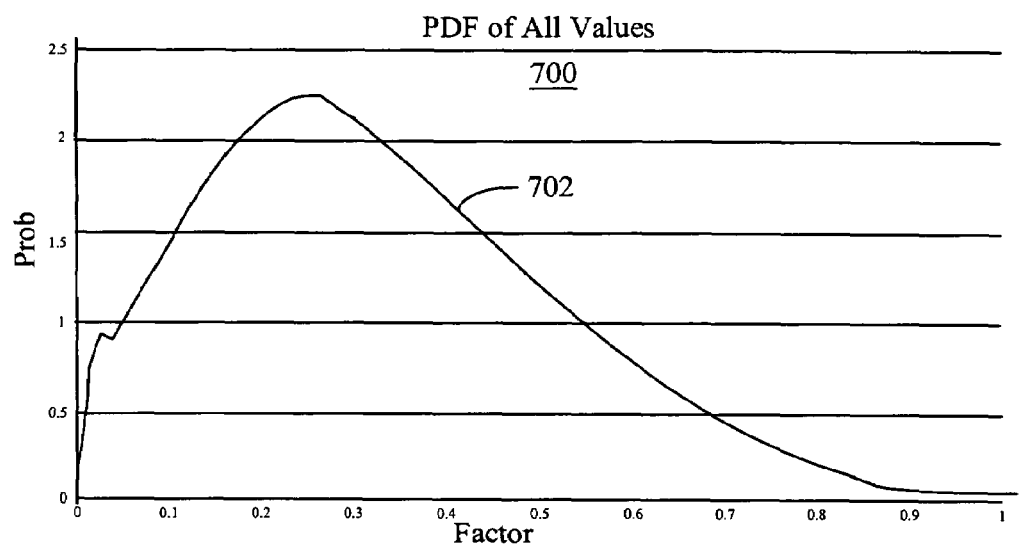
FIG. 7 illustrates the plot of PDF of all values.
Figure 8:
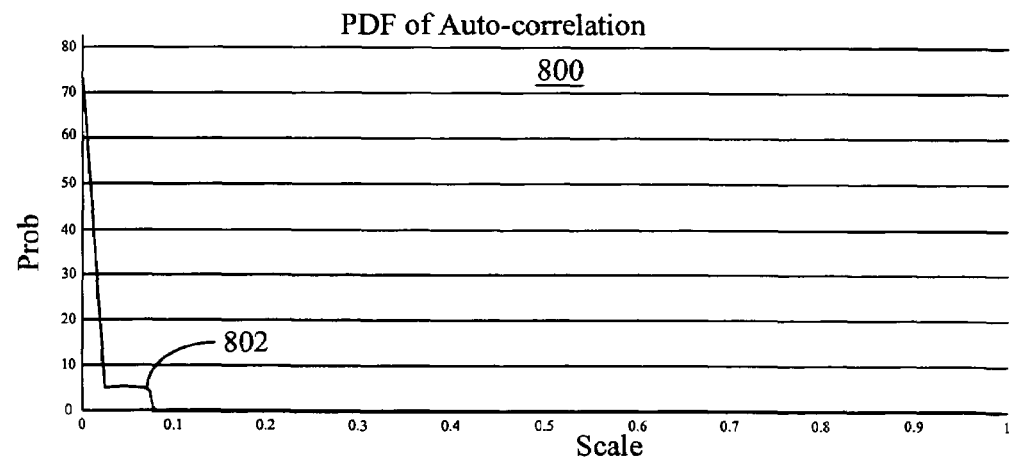
FIG. 8 illustrates the PDF of auto-correlation.

In FIG. 6, a plot of Probability Density Function (PDF) 600 of the off-peak maximum values is shown. The values in the plot have been scaled or normalized so all values must be between 0 and 1 602. The resulting plot 604 shows that the probability of a maximum value is substantially very high. In FIG. 7, the plot of PDF of all values 700 is illustrated. In FIG. 8, the PDF of auto-correlation is illustrated 800. The off-peak statistics for auto-correlation is shown to be at a high probability close to zero according to the plot 802. Thus, demonstrating that the statistics of the cross-correlation off-peak magnitudes are substantially different from the off-peak magnitudes in auto-correlation.

Figure 9:
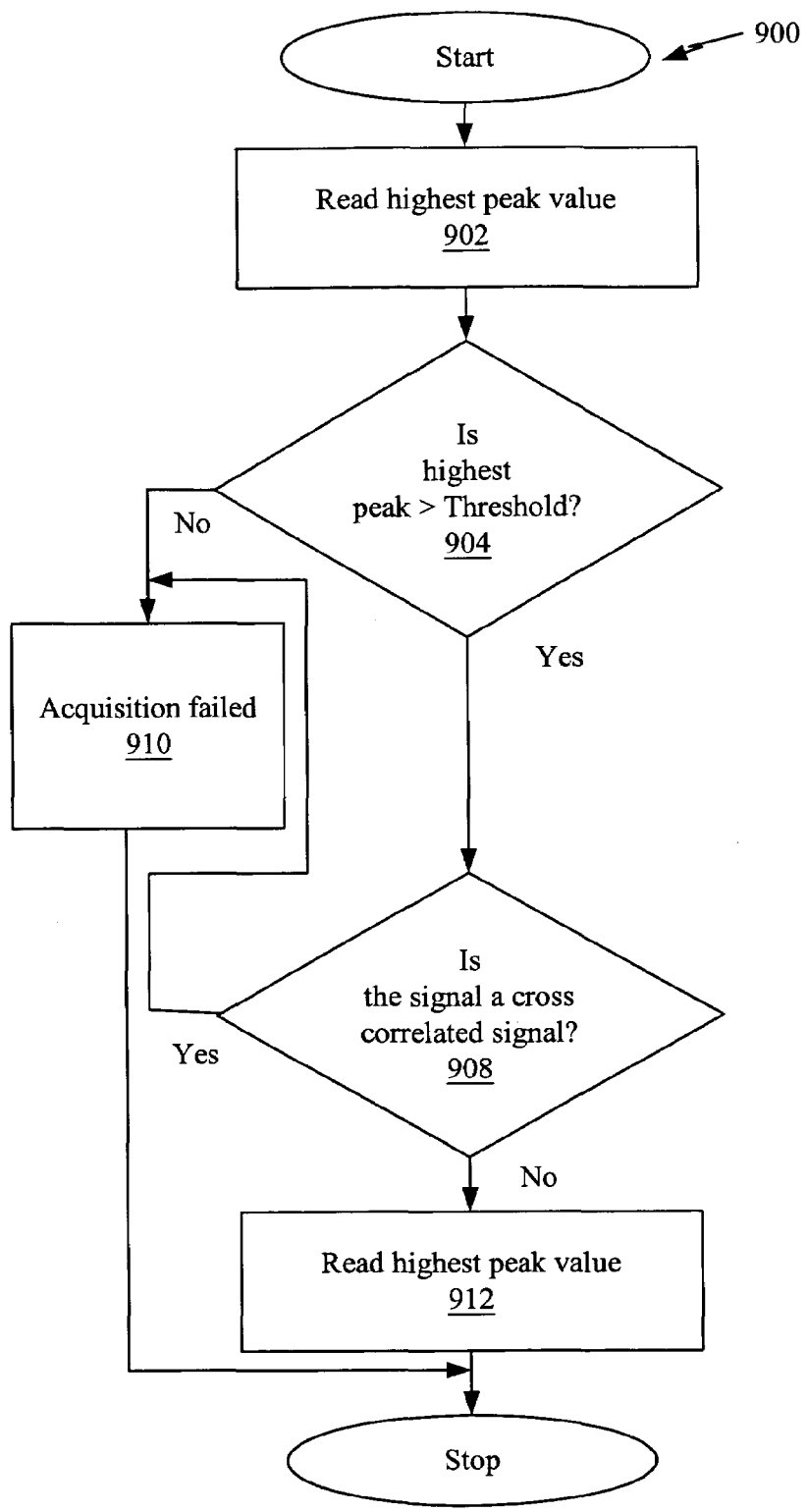
FIG. 9 is a flow diagram of signal detection in the GPS receiver of FIG. 1.

Turning to FIG. 9, a flow diagram 900 of signal detection in the GPS receiver of FIG. 1 is shown. The highest peak value stored in RAM 332 is read in step 902. The highest peak value is then compared to a threshold in step 904 in order to determine if an acquisition of a signal has not failed. If acquisition has not failed in step 904, then a determination of a cross-correlated is made in step 908. If cross-correlation is not found in step 908, then acquisition of a signal is successful in step 912. Otherwise the signal is cross-correlated in step 908 and acquisition fails in step 910.

Figure 10:
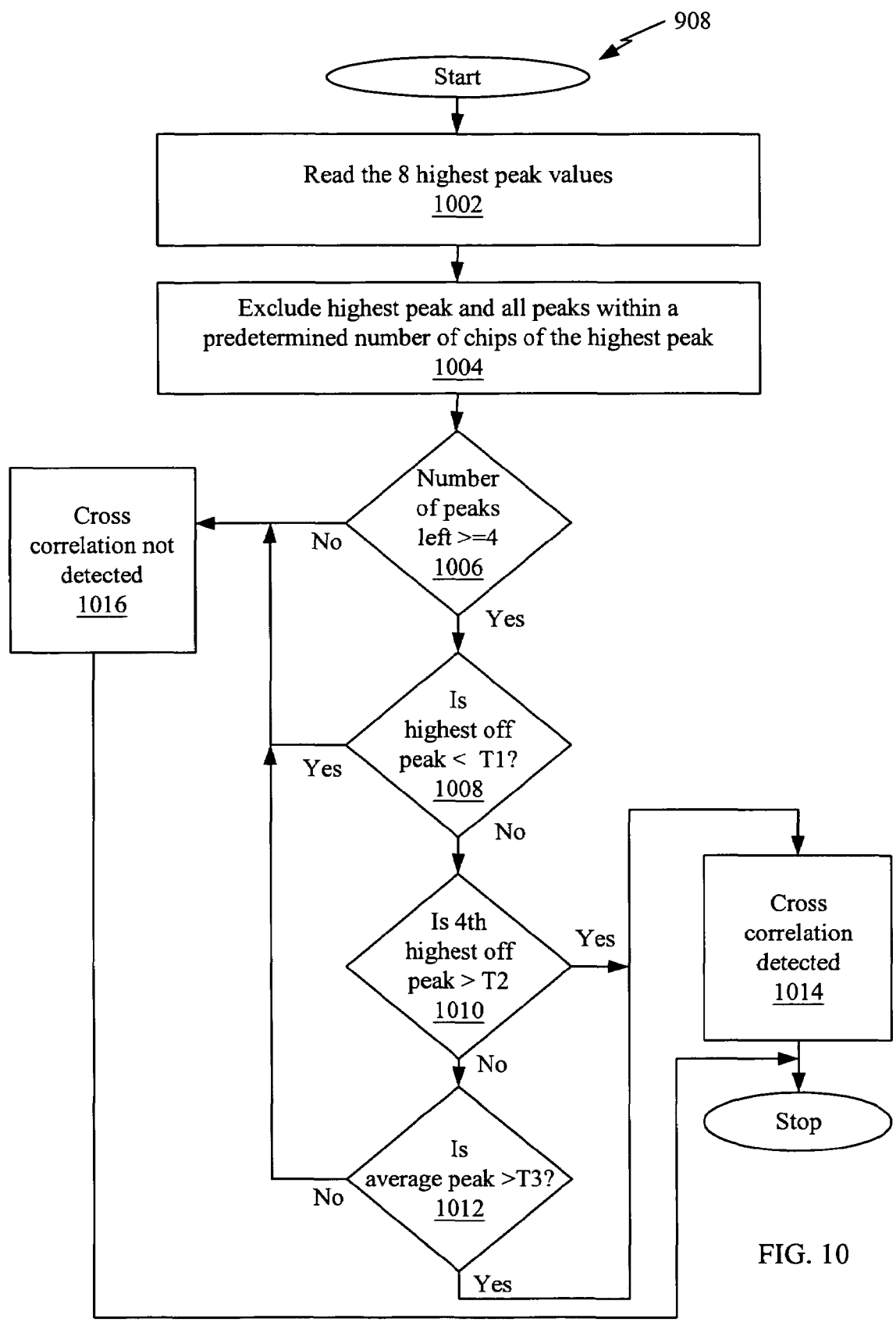
FIG. 10 is a flow diagram of cross-correlation detection of FIG. 9.

In FIG. 10, a flow diagram of cross-correlation detection of step 908 in the GPS receiver of FIG. 9 is shown. The eight highest peak values are read in step 1002 from memory 332. The highest peak and peaks within +/−2 chips of the highest peak are excluded in step 1004. The numbers of peaks left are then counted and compared to a threshold of four peaks in step 1006. If four or more peaks are present in step 1006, then the highest among these peaks, denoted by "M1", is compared to a threshold "T1" in step 1008. If "M1" is less than "T1", then we declare auto-correlation. If not, then we compare the fourth highest peak "M4" to another threshold "T2" in step 1010. If the fourth highest peak "M4" is greater than "T2" in step 1010, then we declare cross-correlation in step 1014. If not, then a determination is made of the average peak in step 1012. If the average peak "A" is greater than a threshold "T3" in step 1012, then cross-correlation has been detected in step 1014 and processing may stop. Otherwise, if the average peak "A" is not greater than the threshold T3, then cross-correlation has not been detected in step 1016 and processing may stop. In other implementations, other number of peaks may be use other than four peaks and a different peak other than the fourth highest peak may be used.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A device, comprising:
 a receiver capable of receipt of a signal that contains more than one pseudo noise (PN) coded signal component;
 a memory coupled to the receiver that stores a plurality of off-peak energy values associated with a PN; and
 a controller coupled to the memory that identifies a sub-set of off-peak energy values are off-peak energy values in order to identify auto-correlation and cross-correlation using the off-peak energy values, and if inconclusive the controller calculates an average of off-peak energy values to identify auto-correlation and cross correlation, where a maximum off-peak energy value from the plurality of off-peak energy values is identified and compared to a predetermined threshold in order to identify auto-correlation.

2. The device of claim 1, where the maximum off-peak energy value is less than the predetermined threshold signifies that auto-correlation exists.

3. The device of claim 1, where a fourth largest off-peak energy value from the plurality of off-peak energy values is identified and compared to another threshold in order to identify cross-correlation.

4. The device of claim 3, where the fourth largest off-peak energy value is greater than the other threshold identifies cross-correlation.

5. The device of claim 1, further comprising:
an average off-peak energy value that is calculated. by the controller and compared to yet another threshold.

6. The device of claim 5, where the average off-peak energy being less then the yet another threshold signifies auto-correlation.

7. A method for determining auto-correlation or cross correlation of a signal, comprising:
receiving a signal from a receiver that contains more than one pseudo noise (PN) coded signal component;
storing in a memory coupled to the receiver a plurality of off-peak energy values associated with a PN; and
retrieving a sub-set of off-peak energy values with a controller that is coupled to the memory that are off-peak energy values in order to identify auto-correlation and cross-correlation using the oft-peak energy values, with
identifying where a maximum off-peak energy value from the plurality of off-peak energy values; and
comparing the maximum off-peak energy value to a predetermined threshold in order to identify auto-correlation;
and if inconclusive the controller calculates an average of off-peak energy values to identity auto-correlation and cross-correlation.

8. The method of claim 7, where the maximum off-peak energy value is less than the predetermined threshold signifies that auto-correlation exists.

9. The method of claim 7, further including:
identifying a fourth largest off-peak energy value from the plurality of off-peak energy values; and
comparing the fourth largest off-peak energy value to another threshold in order to identify cross-correlation.

10. The method of claim 9, where the fourth largest off-peak energy value is greater than the other threshold identifies cross-correlation.

11. The method of claim 7, further comprising:
calculating with the controller an average off-peak energy value; and
comparing the average off-peak energy value to yet another threshold.

12. The method of claim 11, where the average off-peak energy being less then the yet another threshold signifies auto-correlation.

13. A device for determining auto-correlation or cross correlation of a signal, comprising:
means for receiving the signal that contains more than one pseudo noise (PN) coded signal component;
means for storing a plurality of off-peak energy values associated with a PN; and
means for retrieving a sub-set of off-peak energy values that are off-peak energy values in order to identify auto-correlation and cross-correlation using the off-peak energy values with
means for identifying where a maximum off-peak energy value from the plurality of off-peak energy values; and
means for comparing the maximum off-peak energy value to a predetermined threshold in order to identify auto-correlation;
and if inconclusive the controller calculates an average of off-peak energy values to identify auto-correlation and cross-correlation.

14. The device of claim 13, where the maximum off-peak energy value is less than the predetermined threshold signifies that auto-correlation exists.

15. The method of claim 13, further including:
means for identifying a fourth largest off-peak energy value from the plurality of off-peak energy values; and
means for comparing the fourth largest off-peat energy value to another threshold in order to identify cross-correlation.

16. The device of claim 15, where the fourth largest off-peak energy value is greater than the other threshold identifies cross-correlation.

17. The device of claim 13, further comprising:
means for calculating an average off-peak energy value; and
means for comparing the average off-peak energy value to yet another threshold.

18. The device of claim 17, where the average off-peak energy being less then the yet another threshold signifies auto-correlation.

* * * * *

UNITED STATES PATENT AND TRADEMARK OFFICE
CERTIFICATE OF CORRECTION

| | | |
|---|---|---|
| PATENT NO. | : 7,680,178 B2 | Page 1 of 1 |
| APPLICATION NO. | : 11/297802 | |
| DATED | : March 16, 2010 | |
| INVENTOR(S) | : Raman et al. | |

It is certified that error appears in the above-identified patent and that said Letters Patent is hereby corrected as shown below:

In Column 5, Line 20, delete "FIG. 2." and insert -- FIG. 2, --, therefor.

In Column 11, Line 5, in Claim 5, delete "calculated." and insert -- calculated --, therefor.

In Column 11, Line 19, in Claim 7, delete "oft-peak" and insert -- off-peak --, therefor.

In Column 11, Line 26, in Claim 7, delete "identity" and insert -- identify --, therefor.

In Column 12, Line 26, in Claim 15, delete "method" and insert -- device --, therefor.

In Column 12, Line 29, in Claim 15, delete "off-peat" and insert -- off-peak --, therefor.

Signed and Sealed this
Second Day of October, 2012

David J. Kappos
*Director of the United States Patent and Trademark Office*